United States Patent
Zhan

(10) Patent No.: US 10,162,993 B2
(45) Date of Patent: Dec. 25, 2018

(54) FINGERPRINT DETECTION CIRCUIT, SENSOR AND TOUCH SCREEN

(71) Applicant: SHENZHEN GOODIX TECHNOLOGY CO., LTD., Guangdong (CN)

(72) Inventor: Chang Zhan, Guangdong (CN)

(73) Assignee: SHENZHEN GOODIX TECHNOLOGY CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/109,151

(22) PCT Filed: Mar. 9, 2015

(86) PCT No.: PCT/CN2015/073914
§ 371 (c)(1),
(2) Date: Jun. 30, 2016

(87) PCT Pub. No.: WO2016/070536
PCT Pub. Date: May 12, 2016

(65) Prior Publication Data
US 2017/0235992 A1    Aug. 17, 2017

(30) Foreign Application Priority Data
Nov. 7, 2014    (CN) .......................... 2014 1 0625970

(51) Int. Cl.
*G06K 9/00* (2006.01)
*G06F 3/044* (2006.01)
*G06F 3/041* (2006.01)

(52) U.S. Cl.
CPC ........... *G06K 9/0002* (2013.01); *G06F 3/044* (2013.01); *G06F 3/0418* (2013.01)

(58) Field of Classification Search
CPC ......... G06F 3/0416; G06F 2203/04106; G06F 3/044; G06F 3/041
See application file for complete search history.

(56) References Cited

U.S. PATENT DOCUMENTS 6,681,033 B1    1/2004  Yano et al.
9,152,841 B1 †  10/2015 Riedijk
(Continued)

FOREIGN PATENT DOCUMENTS

CN    103810479 A    5/2014
CN    103902971 A    7/2014
(Continued)

OTHER PUBLICATIONS

International Search Report issued in PCT/CN2015/073914, dated Jul. 2, 2015.
(Continued)

*Primary Examiner* — Md Saiful A Siddiqui
(74) *Attorney, Agent, or Firm* — Heslin Rothenberg Farley & Mesiti P.C.

(57) ABSTRACT

A fingerprint detection circuit includes: a detection electrode, where a first capacitance is formed between a finger and the detection electrode, a second capacitance is formed between the finger and a virtual ground, and a parasitic capacitance is formed between the detection electrode and the virtual ground; an amplifier, where an inverting input end of the amplifier is connected to the detection electrode and a non-inverting input end of the amplifier is connected to an excitation signal; and a feedback capacitance, where one end of the feedback capacitance is connected to the inverting input end of the amplifier, the other end of the feedback capacitance is connected to an output end of the amplifier, and the output end of the amplifier outputs an output signal of the fingerprint detection circuit. There is no need to (Continued)

connect an excitation signal to a finger of a user through an external electrode.

15 Claims, 4 Drawing Sheets

(56) References Cited

U.S. PATENT DOCUMENTS

| | | | |
|---|---|---|---|
| 2007/0164756 A1* | 7/2007 | Lee | ............... H03K 17/962 324/662 |
| 2008/0069413 A1* | 3/2008 | Riedijk | ............ G06K 9/0002 382/124 |
| 2011/0102569 A1† | 5/2011 | Erhart | |
| 2014/0047706 A1 | 2/2014 | Shaikh et al. | |
| 2014/0103941 A1* | 4/2014 | Chou | ............... G06F 3/044 324/658 |

FOREIGN PATENT DOCUMENTS

| | | |
|---|---|---|
| CN | 203689535 U | 7/2014 |
| CN | 203746088 U | 7/2014 |
| CN | 203930275 U | 11/2014 |
| CN | 104331202 A | 2/2015 |

OTHER PUBLICATIONS

Kwang-Hyun Lee and Euisik Yoon, A 500dpi Capacitive-Type CMOS Fingerprint Sensor with Pixel-Level Adaptive Image Enhancement Scheme, IEEE ISSCC 2002/Session 21/TD: Sensors and Microsystems/21.3., Published Aug. 7, 2002.†

\* cited by examiner
† cited by third party

FINGERPRINT DETECTION CIRCUIT, SENSOR AND TOUCH SCREEN

CROSS REFERENCE TO RELATED APPLICATIONS

This application is the National Phase filing under 35 U.S.C. § 371 of PCT International Application No. PCT/CN2015/073914 filed Mar. 9, 2015, and published as WO 2016/070536 A1 on May 12, 2016, which claims priority to Chinese Application No. 201410625970.0, filed Nov. 7, 2014. The contents of each of the prior applications are hereby incorporated by reference herein in their entirety.

BACKGROUND

Technical Field

The present invention relates to the field of fingerprint detection technologies, and more particularly to a fingerprint detection circuit, a sensor, and a touch screen.

Related Art

At present, capacitive sensing fingerprint detection apparatuses have been applied to new-generation electronic devices, especially to mobile terminals. However, in order that an electronic device performs fingerprint detection, generally an excitation signal needs to be connected to a finger of a user through an external electrode. For example, in a fingerprint sensor element shown in FIG. 1(a) and FIG. 1(b), $U_{signal}$ needs to be connected to a finger of a user through an external electrode, and an in-phase input end of an amplifier needs to be connected to a virtual ground. Similarly, for another example, in a pixel sensing circuit shown in FIG. 1(c), $\Delta V_{finger}$ needs to be connected to a finger of a user, and an in-phase input end of an amplifier needs to be connected to a virtual ground. As a result, two metal plates are required for each pixel. In other words, in all existing detection methods, a finger of a user needs to be in contact with an external electrode, so that an excitation signal is connected to the finger of the user through external electrode, forming a fingerprint detection loop together with a circuit that is in a detection chip.

SUMMARY

The present invention is to solve at least one of the aforementioned technical problems.

Accordingly, a first objective of the present invention is to provide a fingerprint detection circuit. According to the fingerprint detection circuit, all signals of the circuit are in a detection chip and there is no need to connect an excitation signal to a finger of a user through an external electrode, making fingerprint detection applicable to more scenarios.

To achieve the above objective, a fingerprint detection circuit according to an embodiment of a first aspect of the present invention includes: a detection electrode, where a first capacitance is formed between a finger and the detection electrode, a second capacitance is formed between the finger and a virtual ground, and a parasitic capacitance is formed between the detection electrode and the virtual ground; an amplifier, where an inverting input end of the amplifier is connected to the detection electrode and a non-inverting input end of the amplifier is connected to an excitation signal; and a feedback capacitance, where one end of the feedback capacitance is connected to the inverting input end of the amplifier, the other end of the feedback capacitance is connected to an output end of the amplifier, and the output end of the amplifier outputs an output signal of the fingerprint detection circuit.

A second objective of the present invention is to provide a fingerprint detection sensor. To achieve the above objective, a fingerprint detection sensor according to an embodiment of a second aspect of the present invention includes a plurality of pixel units, where each of pixel units corresponds to one fingerprint detection circuit, and the fingerprint detection circuit is the fingerprint detection circuit according to the embodiment of the first aspect of the present invention.

A third objective of the present invention is to provide a touch screen. To achieve the above objective, a touch screen according to an embodiment of a third aspect of the present invention includes the fingerprint detection sensor according to the embodiment of the second aspect of the present invention.

In the embodiments of the present invention, fingerprint information of a user is reflected in a capacitance formed between the detection electrode and a finger and is further reflected in an output signal, so that all signals of the fingerprint detection circuit are in a detection chip and there is no need to connect an excitation signal to a finger of the user through an external electrode, making fingerprint detection applicable to more scenarios. For example, detection electrodes arranged in an array may be placed under the screen glass of a mobile terminal.

Additional features and advantages of the present invention will be set forth in part in the description which follows, and in part will be obvious from the description, or may be learned by practice of the present invention.

BRIEF DESCRIPTION OF THE DRAWINGS

The aforementioned and/or additional aspects and advantages of the present invention will be apparent and readily appreciated from the detailed description hereinafter, taken in conjunction with the accompanying drawings in which.

DETAILED DESCRIPTION

Figure 1A:
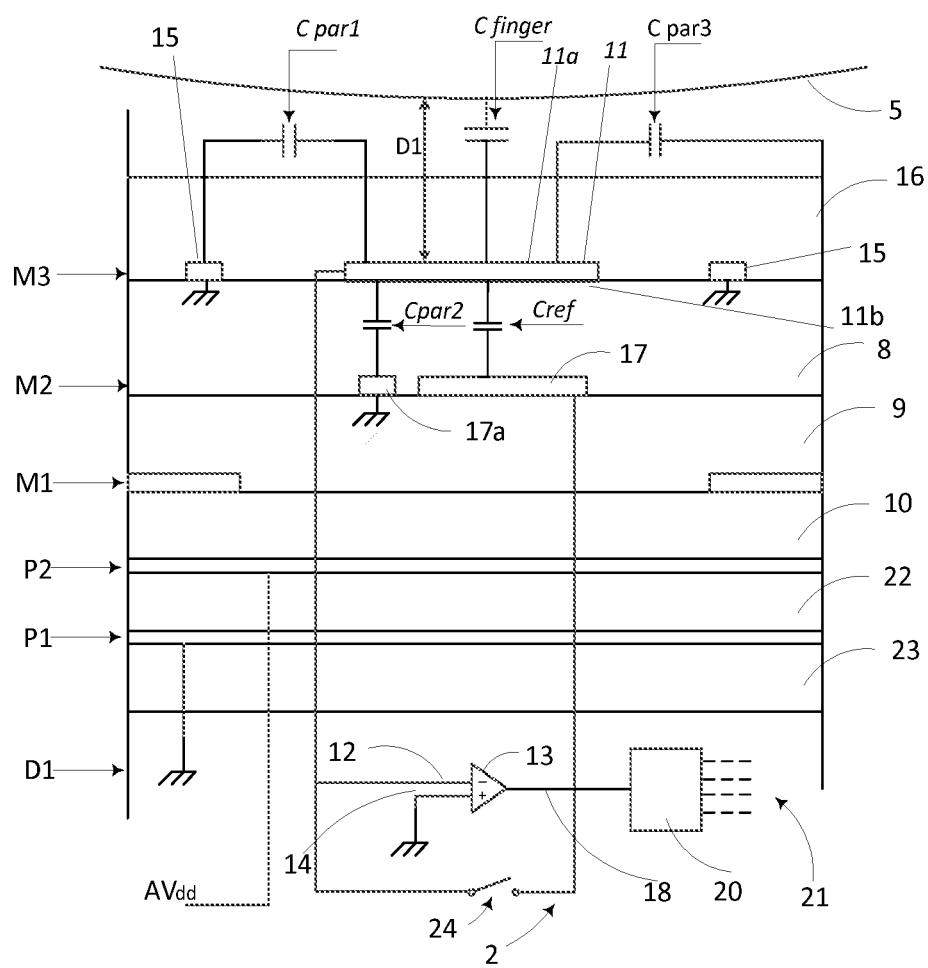
FIG. 1(a) to FIG. 1(c) are schematic structural diagrams of detection circuits for fingerprint detection in the prior art.
Figure 1B:
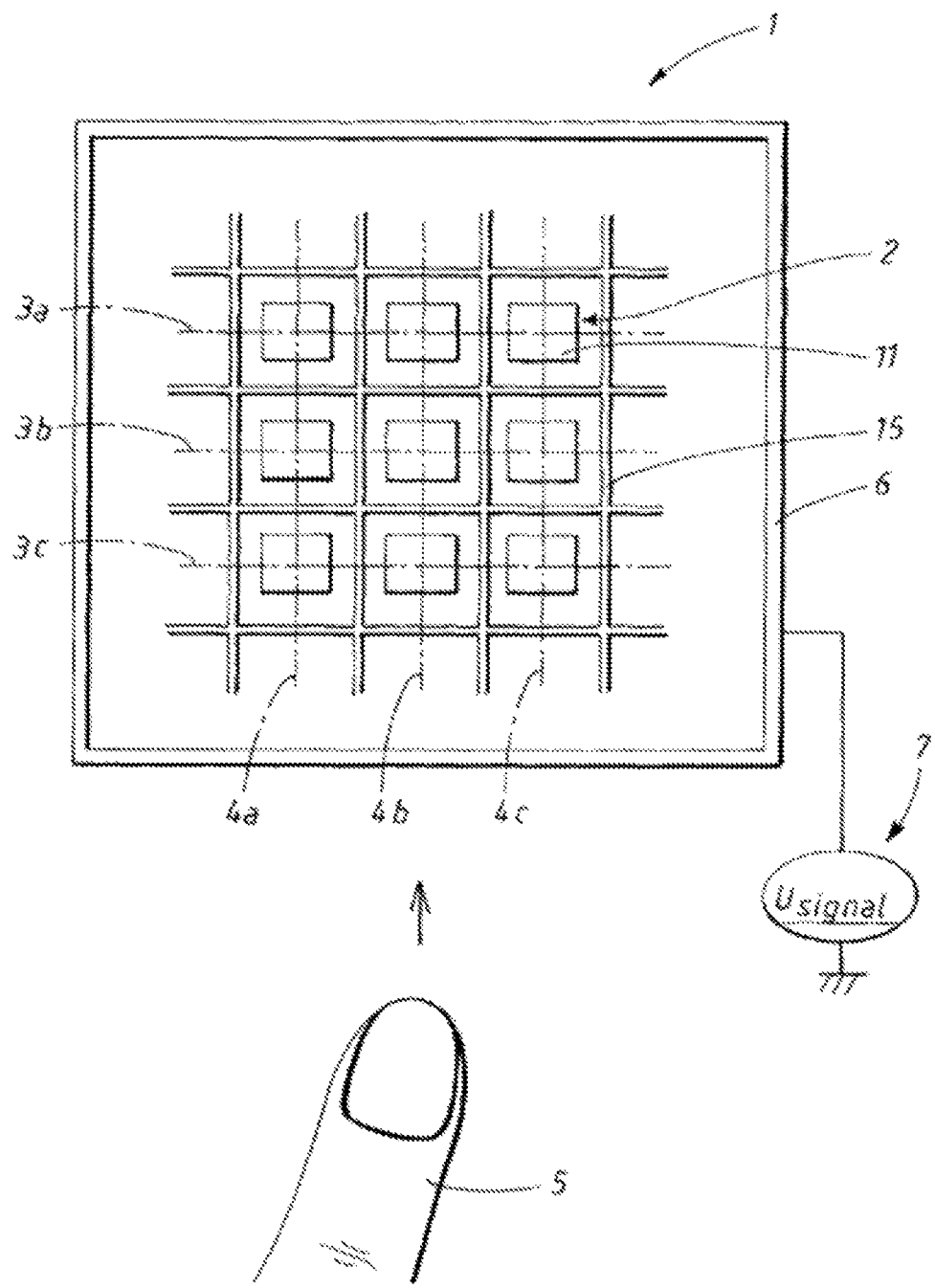
Figure 1C:
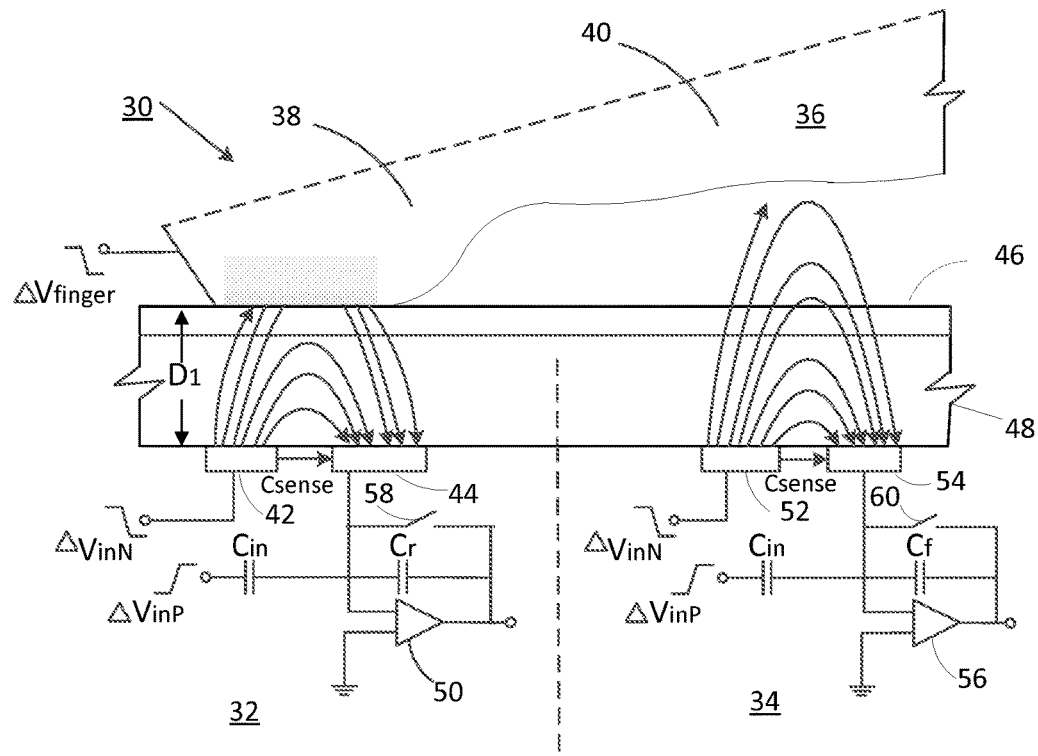

The embodiments of the present invention will be described in detail below with reference to the accompanying drawings in which same or similar reference numerals indicate the same or similar elements, or elements with same or similar function. The embodiments described below with reference to the accompanying drawings are exemplary and are merely used to explain the present invention, but should not be construed as limiting the present invention. On the contrary, the embodiments of the present invention encompass all alterations, modifications, and equivalents that fall within the spirit and scope of the appended claims.

In the description of the present invention, it should be understood that the terms such as "first" and "second" are used merely for the purpose of description, but shall not be construed as indicating or implying relative importance. In the description of the present invention, it should be noted that unless otherwise explicitly specified or defined, the terms such as "connect" and "connection" should be interpreted in a broad sense. For example, a connection may be a fixed connection, or may be a detachable connection or an integral connection; a connection may be a mechanical connection, or may be an electrical connection; a connection may be a direct connection, or may be an indirect connection via an intermediate medium. It may be appreciated by those of ordinary skill in the art that the specific meanings of the aforementioned terms in the present invention can be understood depending on specific situations. In addition, in the description of the present invention, unless otherwise specified, "a plurality of" indicates two or more.

Any process or method described in a flowchart or described herein in other ways may be construed as including one or more modules, segments, or portions of code of executable instructions for implementing steps of particular logical functions or processes. In addition, the scope of a preferred embodiment of the present invention includes other implementations, in which functions may be executed not in the order shown or discussed but simultaneously or in reverse order based on the related functions. This should be understood by those skilled in the art.

The following describes a fingerprint detection circuit, a sensor, and a touch screen according to the embodiments of the present invention with reference to the accompanying drawings.

Figure 2:
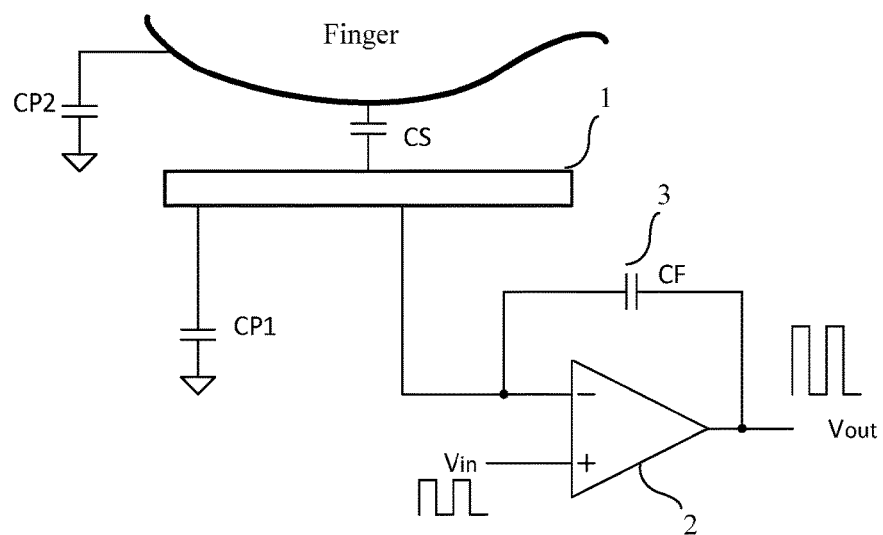
FIG. 2 is a schematic structural diagram of a fingerprint detection circuit according to an embodiment of the present invention.
Figure 3:
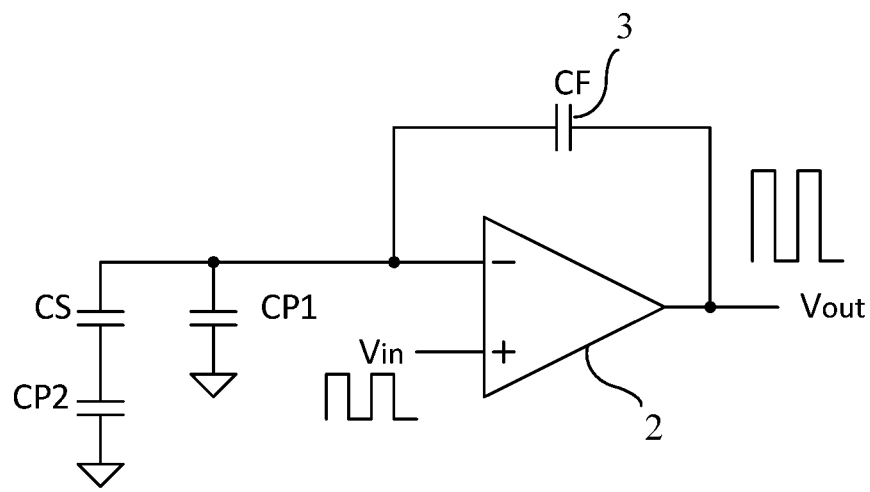
FIG. 3 is an equivalent circuit diagram of a fingerprint detection circuit according to an embodiment of the present invention.

FIG. 2 is a schematic structural diagram of a fingerprint detection circuit according to one embodiment of the present invention. FIG. 3 is an equivalent circuit diagram of a fingerprint detection circuit according to one embodiment of the present invention. As shown in FIG. 2, the fingerprint detection circuit includes: a detection electrode 1, an amplifier 2, and a feedback capacitance 3.

Specifically, in one embodiment of the present invention, the detection electrode 1 is a metal electrode, and has a contact surface that is for contact with a finger and that is in the shape of, for example, but not limited to, a rectangle, a square, or a circle. For example, as shown in FIG. 2, the detection electrode 1 is formed by metal at the top layer. An inverting input end of the amplifier 2 is connected to the detection electrode 1. A first capacitance CS is formed between the detection electrode 1 and a finger of a user, a parasitic capacitance $CP_1$ is formed between the detection electrode 1 and a virtual ground, and a second capacitance $CP_2$ is formed between the finger of the user and the virtual ground.

It should be understood that the virtual ground refers to an alternating-current ground, that is, there is no direct-current voltage, or there may be a direct-current voltage of some value.

A non-inverting input end of the amplifier 2 is connected to an excitation signal $V_{in}$. One end of the feedback capacitance 3 is connected to the inverting input end of the amplifier 2, and the other end of the feedback capacitance 3 is connected to an output end of the amplifier 2. In other words, the feedback capacitance 3 is connected between the inverting input end and the output end of the amplifier 2. The feedback capacitance has a capacitance CF.

The output end of the amplifier 2 outputs an output signal of the fingerprint detection circuit. That is, a waveform outputted from the output end of the amplifier is an output signal $V_{out}$ of the fingerprint detection circuit.

Further, a reset switch is connected between the inverting input end and the output end of the amplifier to reset a voltage between the two nodes in a reset stage.

Furthermore, an equivalent circuit diagram shown in FIG. 3 can be obtained according to the fingerprint detection circuit. In FIG. 3, the output signal may be expressed as:

$$V_{out} = V_{in}\left[1 + \frac{CP_1}{CF} + \frac{CS \cdot CP_2}{CF(CS + CP_2)}\right]$$

where $V_{out}$ is the output signal of the fingerprint detection circuit, $V_{in}$ is the excitation signal, $CP_1$ is the parasitic capacitance between the detection electrode and the virtual ground, CF is the feedback capacitance between the inverting input end and the output end of the amplifier, CS is the first capacitance formed between the detection electrode and the finger, and $CP_2$ is the second capacitance between the finger and the virtual ground.

When a difference between $CP_2$ and CS is greater than a preset threshold, for example, generally, $CP_2$ is greater than 100×CS, that is, when $CP_2$ is far greater than $CP_1$, the output signal may be simplified as:

$$V_{out} = V_{in}\left[1 + \frac{CP_1}{CF} + \frac{CS}{CF}\right].$$

It should be understood that $CP_2$ being greater than 100×CS is exemplary, and the output signal of the circuit can also be simplified when $CP_2$ does not reach 100 times CS. In practice, the output signal of the circuit may be simplified when $CP_2$ is greater than 10 times CS.

It can be seen from the simplified output signal that because the finger has an uneven surface, a capacitance formed between a "peak" of a fingerprint and the detection electrode is different from that formed between a "valley" of the fingerprint and the detection electrode. Therefore, fingerprint information of the user can be reflected in the first capacitance CS formed between the detection electrode and the finger, and can also be reflected in the output signal $V_{out}$. That is, the capacitance between the detection electrode and the finger of the user can be obtained according to the output signal of the amplifier 3.

It should be understood that the conversion of the output signal $V_{out}$ outputted by the amplifier 3 to the first capacitance CS between the detection electrode and the finger of the user can be implemented by using a conventional technology, and details are not described herein.

According to the fingerprint detection circuit of this embodiment of the present invention, the fingerprint information of the user is reflected in the first capacitance CS formed between the detection electrode and the finger and is further reflected in the output signal $V_{out}$, so that all signals of the fingerprint detection circuit are in a detection chip and there is no need to connect the excitation signal $V_{in}$ to the finger of the user through an external electrode, making fingerprint detection applicable to more scenarios. For example, a detection electrode arranged in an array may be placed under the screen glass of a mobile terminal.

The present invention further provides a fingerprint detection sensor. The fingerprint detection sensor includes a plurality of pixel units, where each of the pixel units corresponds to one fingerprint detection circuit, and the fingerprint detection circuit is the fingerprint detection circuit described in the above embodiment.

Figure 4A:
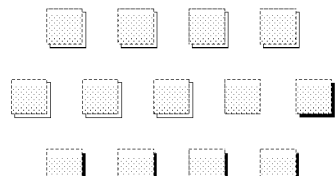
FIG. 4(a) and FIG. 4(b) illustrate arrangement patterns of pixel units in a fingerprint detection sensor according to an embodiment of the present invention.
Figure 4B:
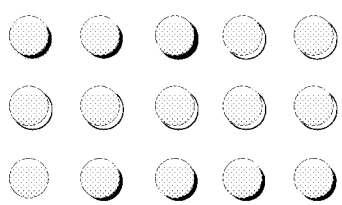

Further, the pixel units are arranged in a two-dimensional array. That is, the detection electrodes are also arranged in a two-dimensional array, to form a contact surface for touching by a finger. As shown in FIG. 4(a) and FIG. 4(b), in FIG. 4(b), rows and columns of the two-dimensional array are perpendicular to each other.

To implement the above embodiments, the present invention further provides a touch screen.

The touch screen includes the fingerprint detection circuit or the fingerprint detection sensor according to any one of the embodiments of the present invention.

According to the touch screen of this embodiment of the present invention, the fingerprint information of the user is reflected in the first capacitance CS formed between the detection electrode and the finger and is further reflected in the output signal $V_{out}$, so that all signals of the fingerprint detection circuit are in a detection chip and there is no need to connect the excitation signal $V_{in}$ to the finger of the user through an external electrode, making fingerprint detection applicable to more scenarios. For example, a detection electrode arranged in an array may be placed under the screen glass of a mobile terminal.

It should be understood that all parts of the present invention can be implemented by using hardware, software, firmware, or a combination thereof In the above embodiments, multiple steps or methods can be stored in a memory and implemented by software or firmware that is run by a suitable instruction execution system. For example, if implemented by using hardware, the same as that in another embodiment, any one of or a combination of the following technologies that are well-known in the art can be used: a discrete logic circuit having a logic gate circuit configured to implement a logic gate function for a data signal, an application-specific integrated circuit having a suitable combinational logic gate circuit, a programmable gate array (PGA), a field-programmable gate array (FPGA), and the like.

In the description of this specification, the terms such as "one embodiment", "some embodiments", "example", "specific example", or "some examples" mean that specific features, structures, materials, or characteristics described with reference to the embodiment or example are included in at least one embodiment or example of the present invention. In this specification, the exemplary expressions of the aforementioned terms are not necessarily referring to the same embodiment or example. Moreover, the described specific features, structures, materials, or characteristics may be combined in a suitable manner in any one or more embodiments or examples.

Although the embodiments of the present invention have been shown and described, those of ordinary skill can understand that multiple alterations, modifications, replacements, and variations can be made to these embodiments without departing from the principles and objectives of the present invention. The scope of the present invention is subject to the claims and their equivalents.

What is claimed is:

1. A fingerprint detection circuit, comprising:
   a detection electrode, wherein a first capacitance is formed between a finger and the detection electrode, a second capacitance is formed between the finger and a virtual ground, and a parasitic capacitance is formed between the detection electrode and the virtual ground wherein the virtual ground comprises and alternating-current ground;
   an amplifier, wherein an inverting input end of the amplifier is connected to the detection electrode and a non-inverting input end of the amplifier is connected to an excitation signal; and
   a feedback capacitance, wherein one end of the feedback capacitance is connected to the inverting input end of the amplifier, an other end of the feedback capacitance is connected to an output end of the amplifier, and the output end of the amplifier outputs an output signal of the fingerprint detection circuit; and
   wherein the output signal is;

$$V_{out} = V_{in}\left[1 + \frac{CP_1}{CF} + \frac{CS \cdot CP_2}{CF(CS + CP_2)}\right]$$

wherein $V_{out}$ is the output signal of the fingerprint detection circuit, $V_{in}$ is the excitation signal, $CP_1$ is the parasitic capacitance, CF is the feedback capacitance, CS is the first capacitance, and $CP_2$ is the second capacitance.

2. The fingerprint detection circuit according to claim 1, wherein the detection electrode comprises a metal electrode.

3. The fingerprint detection circuit according to claim 1, wherein when a difference between $CP_2$ and CS is greater than a preset threshold, the output signal is:

$$V_{out} = V_{in}\left[1 + \frac{CP_1}{CF} + \frac{CS}{CF}\right].$$

4. The fingerprint detection circuit according to claim 1, further comprising a reset switch operable to connect the inverting input end of the amplifier with the output end of the amplifier.

5. The fingerprint detection circuit according to claim 1, wherein the detection electrode is in the shape of a rectangle, a square, or a circle.

6. A fingerprint detection sensor, wherein the fingerprint detection sensor comprises a plurality of pixel units, each of the pixel units corresponds to one fingerprint detection circuit, and the fingerprint detection circuit comprises:
   a detection electrode, wherein a first capacitance is formed between a finger and the detection electrode, a second capacitance is formed between the finger and a virtual ground, and a parasitic capacitance is formed between the detection electrode and the virtual ground wherein the virtual ground comprises an alternating-current ground;
   an amplifier, wherein an inverting input end of the amplifier is connected to the detection electrode and a non-inverting input end of the amplifier is connected to an excitation signal; and
   a feedback capacitance, wherein one end of the feedback capacitance is connected to the inverting input end of the amplifier, an other end of the feedback capacitance is connected to an output end of the amplifier, and the output end of the amplifier outputs an output signal of the fingerprint detection circuit; and
   wherein the output signal is $$V_{out} = V_{in}\left[1 + \frac{CP_1}{CF} + \frac{CS \cdot CP_2}{CF(CS + CP_2)}\right]$$

wherein $V_{out}$ is the output signal of the fingerprint detection circuit, $V_{in}$ is the excitation signal, $CP_1$ is the parasitic capacitance, $CF$ is the feedback capacitance, $CS$ is the first capacitance, and $CP_2$ is the second capacitance.

7. The fingerprint detection sensor according to claim 6, wherein the plurality of pixel units are arranged in a two-dimensional array.

8. The fingerprint detection sensor according to claim 7, wherein rows and columns of the two-dimensional array are perpendicular to each other.

9. A touch screen, comprising a fingerprint detection sensor according to claim 6.

10. The touch screen according to claim 9, wherein the plurality of pixel units are arranged in a two-dimensional array.

11. The touch screen according to claim 10, wherein rows and columns of the two-dimensional array are perpendicular to each other.

12. The fingerprint detection sensor according to claim 6, wherein the detection electrode comprises a metal electrode.

13. The fingerprint detection sensor according to claim 6, wherein when a difference between $CP_2$ and $CS$ is greater than a preset threshold, the output signal is:

$$V_{out} = V_{in}\left[1 + \frac{CP_1}{CF} + \frac{CS}{CF}\right].$$

14. The fingerprint detection sensor according to claim 6, further comprising a reset switch operable to connect the inverting input end of the amplifier with the output end of the amplifier.

15. The fingerprint detection sensor according to claim 6, wherein the detection electrode is in the shape of a rectangle, a square, or a circle.

* * * * *